United States Patent
Billman et al.

(10) Patent No.: US 11,696,140 B1
(45) Date of Patent: Jul. 4, 2023

(54) AUTHENTICATION BASED ON USER INTERACTION WITH IMAGES OR OBJECTS

(71) Applicant: United Services Automobile Association (USAA), San Antonio, TX (US)

(72) Inventors: Bradly Jay Billman, Celina, TX (US); Jennifer Hunt Erickson, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 17/240,587

(22) Filed: Apr. 26, 2021

Related U.S. Application Data (60) Provisional application No. 63/015,921, filed on Apr. 27, 2020.

(51) Int. Cl.
*H04L 29/06* (2006.01)
*H04W 12/65* (2021.01)
*H04W 12/06* (2021.01)

(52) U.S. Cl.
CPC ........... *H04W 12/65* (2021.01); *H04W 12/06* (2013.01)

(58) Field of Classification Search
CPC .............................. H04W 12/65; H04W 12/06
See application file for complete search history.

(56) References Cited

U.S. PATENT DOCUMENTS

| | | | |
|---|---|---|---|
| 2016/0063235 A1* | 3/2016 | Tussy | H04W 12/06 726/6 |
| 2019/0107990 A1* | 4/2019 | Spivack | G06T 11/60 |
| 2019/0228213 A1* | 7/2019 | MacDonald | G06F 21/316 |
| 2019/0240581 A1* | 8/2019 | Walker | A63F 13/533 |

* cited by examiner

*Primary Examiner* — Wasika Nipa
(74) *Attorney, Agent, or Firm* — Fletcher Yoder, P.C.

(57) ABSTRACT

An authentication system includes an authenticator that receives an authentication request from a device and receives sensor data from one or more sensors, the sensor data being indicative of interaction with one or more real world objects or with a displayed authentication image. The authenticator determines that the sensor data is indicative of an authorized interaction with the one or more real world objects or with the displayed authentication image and, in response to the determination, grants the authentication request.

16 Claims, 7 Drawing Sheets

AUTHENTICATION BASED ON USER INTERACTION WITH IMAGES OR OBJECTS

CROSS-REFERENCE TO RELATED APPLICATIONS

The present application claims priority to and the benefit of U.S. Provisional Application No. 63/015,921, filed Apr. 27, 2020, and entitled "AUTHENTICATION BASED ON USER INTERACTION WITH IMAGES OR OBJECTS," the disclosure of which is incorporated by reference in its entirety herein.

BACKGROUND

The present disclosure relates generally to systems and methods for authentication of users. More specifically, the present disclosure relates to techniques for increasing an accuracy of detecting inauthentic user requests for an access into protected, secretive, sensitive, and/or personal data associated with an authentic user.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Modern organizations typically offer access to services and sensitive data via online portals (e.g., the Internet), which may be accessed from numerous locales across the globe. Because the data and/or services provided by these entities may be valuable, nefarious individuals may attempt to impersonate a user from one of the access sites, in an effort to gain unauthorized access to the data and/or to initiate unauthorized service transactions. To curb these efforts, businesses and other organizations (churches, government, clubs, etc.) typically implement authentication processes. Further, individuals that store sensitive and/or personal information on an electronic device may implement authentication processes to access their electronic devices or accounts or applications associated with their electronic devices. Authentication processes may include asking for username/password combinations. Moreover, some authentication methods include facial and/or voice identification to increase a level of security. Unfortunately, authentication processes are vulnerable to unauthorized intrusions. For example, hackers (e.g., unauthorized users) have exposed vulnerabilities in authentication methods that include facial recognition and/or audio recognition processes using prerecorded and altered video/audio feeds. Accordingly, improved techniques for authentication are desirable.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Provided is an authentication system that includes a sensor system of a mobile device. The sensor system includes a camera. The authentication system also includes a processor of the mobile device that executes instructions of an application stored on the mobile device. The instructions cause the mobile device to activate the camera of the sensor system in response to requesting an authentication request; receive user input to cause the camera to capture an image comprising image data in a field of view of the camera; communicate the captured image to an authenticator of the service; receive authentication based on the authenticator determining that the image data is indicative of a pattern or arrangement of a plurality of real-world objects that is associated with an authorized authentication request; and access the service on the mobile device based on receiving the authentication.

Provided is an authentication system that includes a user interface that generates an authentication request. The authentication system also includes communication circuitry configured to communicate the authentication request. The authentication system also includes one or more sensors configured to generate sensor data indicative of interaction of the one or more sensors with one or more real-world objects or interaction with an image displayed on a display screen. The authentication system also includes an authenticator comprising a processor and a memory. The authenticator is configured to: receive the authentication request and the sensor data; determine that the sensor data is indicative of an authorized interaction with the one or more real-world objects or with the image; and in response to the determination, grant the authentication request.

Provided is a method that includes the steps of receiving an authentication request; providing an authentication image to a device associated with the authentication request to cause the authentication image to be displayed on the device; receiving sensor data indicative of a requestor response to the authentication image; determining that the sensor data indicative of the requestor response is associated with an authorized user; and granting the authentication request based on the determination.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As electronic devices become ubiquitous in society, the security of data is becoming a greater need. In particular, electronic devices such as mobile devices and the Internet of Things (IoT) may store and/or transfer personal and/or sensitive data associated with a person. In order to protect the personal and/or sensitive data (e.g., financial data, medical data) from being intercepted by an undesirable entity, gatekeepers typically authenticate an entity attempting to access such data to determine if the requesting entity is an authorized user.

Currently, techniques for authentication may include receiving an alphanumeric password or receiving biometric information (e.g., a fingerprint, facial images) from a requestor to request access that is associated with a particular authorized user. These techniques above may be compared to respective stored values for authentication. For example, an alphanumeric password may be compared to a predetermined alphanumeric password. In response to receiving the alphanumeric password, the authentication request may be verified, and the request may be designated as being associated with an authorized user. However, many authentication systems require frequent changes of alphanumeric passwords, and users may have trouble remembering these changing passwords and often record passwords in unsecure locations that are vulnerable to interception. Further, alphanumeric passwords are vulnerable to being exposed through social engineering. Another authentication technique may involve receiving biometric information, such as a video feed containing facial images of a requestor and determining if the facial features detected in the video feed matches stored facial features associated with an authorized user. Although facial recognition may be more secure than an alphanumeric password, illegitimate or unauthorized users (e.g., hackers) may employ systems that create a voice or an appearance of a user to access an account associated with a user. Accordingly, accurate authentication techniques that are easy for a user to remember, that resist social engineering or interception, and that augment or replace biometric factors may improve authentication processes.

Present embodiments are generally directed toward improved systems and methods for detecting fraudulent user recognition. Such systems and methods may be used in authenticating requested access into sensitive data (e.g., a bank account associated with a user). In addition, such systems and methods in operation may decrease an amount of unauthorized accesses into the sensitive data. In an embodiment, an authentication system as provided herein may include a real-world object or objects with which a requestor interacts. The nature of the interaction is assessed as at least one factor in authentication.

Present embodiments may also encompass authentication via interaction with and/or response to displayed images. In certain embodiments, the system may display one or more images and assess one or more interactions of the requestor in response to the images to determine if the requestor is an authorized user. For example, certain images may be associated with characteristic brain activity patterns in an authorized user that would be difficult to replicate for an unauthorized user.

Figure 1:
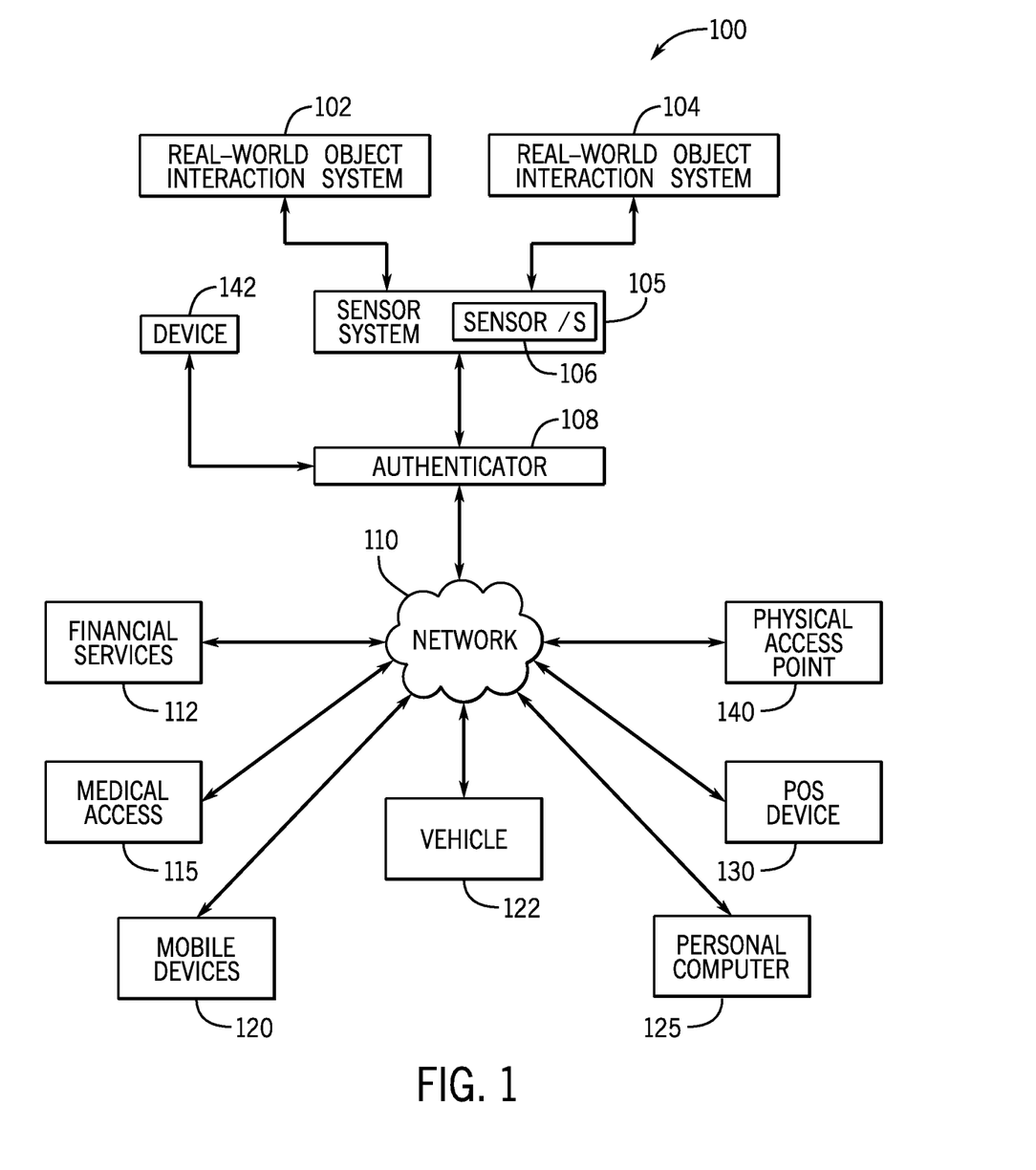
FIG. 1 is a block diagram of an authentication system, in accordance with an embodiment of the present disclosure.

FIG. 1 illustrates an example of an operating environment of an authentication system 100 in which some embodiments may be utilized. As part of the authentication request, the system 100 may capture data from one or both of a real-world interaction system 102 or an image interaction system 104. The data is captured by a sensor system 105 that includes one or more sensors 106, as discussed in more detail herein. Once captured, the data, e.g., sensor data, is communicated to an authenticator 108 that assesses the data to determine if the data is indicative of an interaction associated with an authorized user. Based on the assessment, the authentication request is granted or denied. In certain embodiments, the authenticator 108 may operate as an application resident on the device from which the authentication request originates. In one embodiment, an application (e.g., a mobile device app) may be self-verifying such that, when no network connectivity is available, authentication is possible via stored or local features of the application. In one embodiment, all or part of authenticator 108 may be accessed via network communication 110. For example, the authenticator 108 may be stored in a cloud computing environment.

The authentication request, once granted, may permit access of an authorized user to machines or applications for financial services 112, medical devices 115, mobile devices 120, vehicles 122, personal computers 125, point-of-service devices 130, and/or devices associated with physical access points 140. In an embodiment, the system 100 may communicate authentication requests and capture relevant data (e.g., sensor data) related to the authentication via dedicated terminals, such as public terminals/kiosks or ATM networks. The system 100 may be used in conjunction with financial services applications 112 as part of logging into financial accounts or performing financial transactions. The system 100 may be used in conjunction with medical access points 115, such as medical records applications, medical device applications (e.g., to permit access to a medical device paired with an authorized user), authorized employee access points, etc. The system 100 may be used in conjunction with mobile devices 120, which may be cellular phones, smart phones (a smart phone being a cellular phone that has capabilities and features such as, but not limited to, internet access, a full keyboard, email access, Wi-Fi connection capabilities, BLUETOOTH connectivity, or any other functionality of a computer), tablet computers (a portable computer having a touch interface), netbooks, laptops possibly with a wireless connection (such as an 802.11a/b/g connection or mobile broadband connection, such as via a 3G or 4G wireless network). The system 100 may be used in conjunction with vehicles 122 as part of activation of a personal vehicle, a fleet vehicle, or a rented vehicle. The system 100 may be used in conjunction with personal computers 125, which may be any computer (e.g., desktop computers, laptop computers, netbooks, tablet computers, Internet-enabled television devices, etc.) connected to the network 110. POS devices 130 can be any device used as a checkout for a merchant. For example, POS device 130 can be a terminal located at the merchant, a computer-based interface such as a webpage or custom application, a telephone payment system, and others. The system 100 may be used in conjunction with physical access points 140, such as doors or gates. It should be understood that these are by way of example and other types of devices and/or applications may use components of the system 100 as a gatekeeper.

In one embodiment, the authentication request may originate from a separate requestor device 142. However, the authentication request may alternatively or additionally originate from devices or services for which authentication of the authentication request grants access to one or more functionalities of the services via the device. Further, one or more elements of the real-world object interaction system 102, the image interaction system 104, the sensor system 105, and/or the authenticator 108 may be integrated into the requestor device, the machines or application for financial services 112, the medical devices 115, the mobile devices 120, the vehicles 122, the personal computers 125, the point-of-service devices 130, and/or the devices associated with physical access points 140. In one embodiment, the mobile device 120 includes at least the sensor system 105, and the sensor 106 may include a camera of the mobile device 120.

The system 100 may use the sensor data from the sensor system 105 as all or part of an authentication of an authentication request. For example, the authentication request may also require additional authentication factors, such as user ID, alphanumeric password, two-factor authentication, device recognition, location-based authentication, etc.

Figure 2:
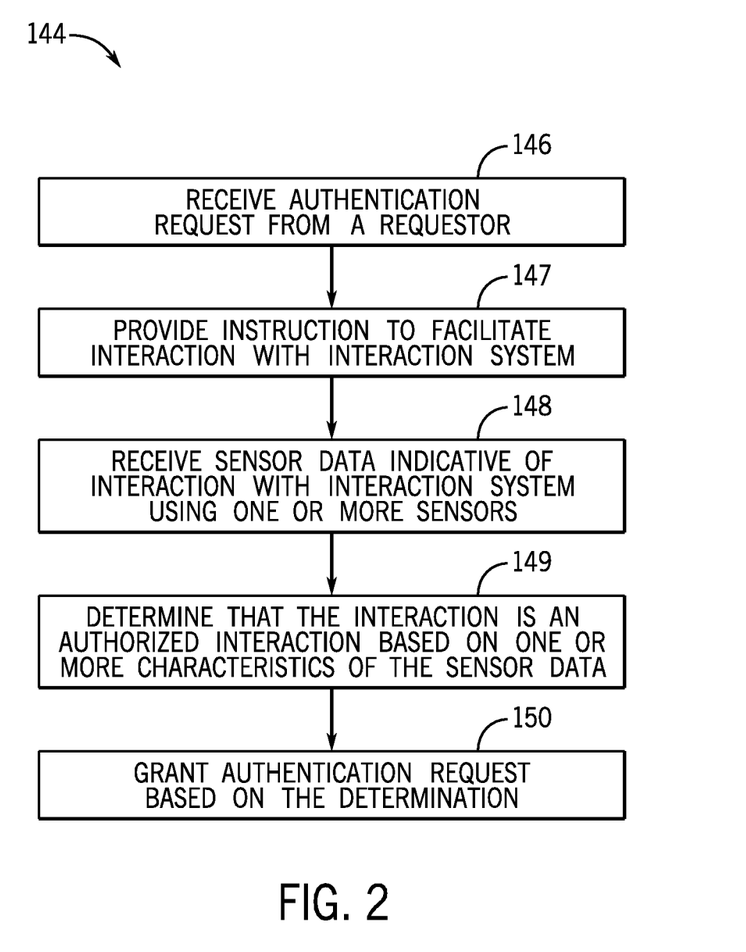
FIG. 2 is a flow diagram of a method of authenticating an authentication request that may be used in conjunction with the system of FIG. 1, in accordance with an embodiment of the present disclosure.

The embodiments illustrated in FIG. 1 allow requestor to use the system 100 to send an authentication request to authenticate the user. As shown in the flow diagram of FIG. 2, a method 144 of authentication includes the step of receiving an authentication request (block 146). The authentication request may include request information, such as an identification or username associated with a particular authorized user, an alphanumeric password, an identification of the originating device, location information, etc. In an embodiment, the authenticator 108 receives the authentication request and provides instructions to facilitate interaction with an interaction system (block 147), such as the real-world interaction system 102 or the image interaction system 104. The instructions may include causing display of prompts on the request-originating device, communication with the sensor system 105, and/or activation of active components of the interaction systems, which may include causing displays of particular authentication images selected based on information in the authentication request. The sensor system 105 detects the interaction with the interaction system using one or more sensors, and the authenticator 108 receives the sensor data indicative of the interaction (block 148), and the authenticator 108 determines if the interaction is an authorized interaction (block 149) based on one or more characteristics of sensor data collected by the sensor system. If the interaction is associated with an authorized user, the authentication request is granted (block 150).

Figure 3:
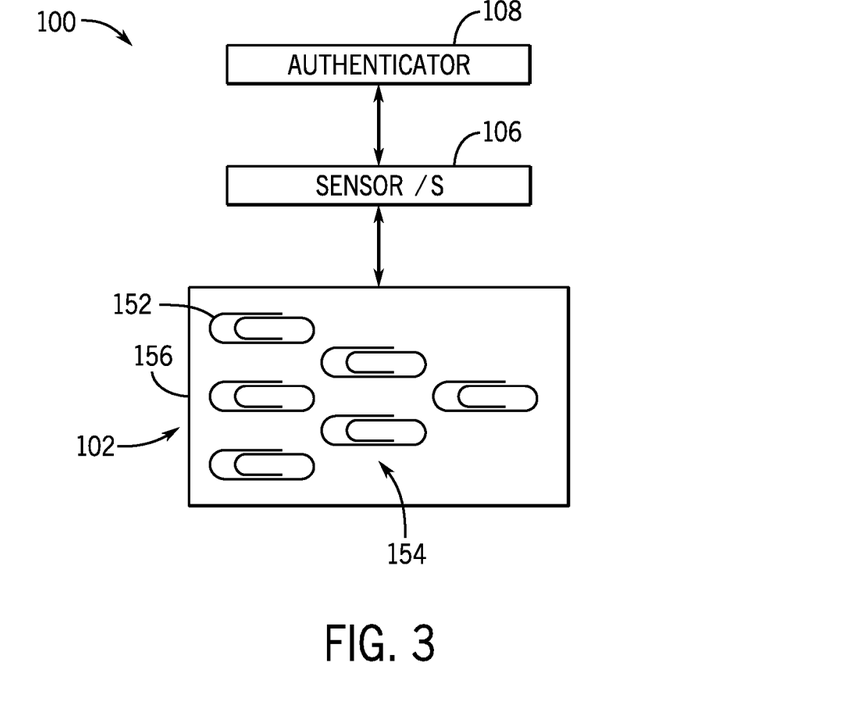
FIG. 3 is a schematic representation of a real-world object interaction system that may be used in conjunction with the system of FIG. 1, in accordance with an embodiment of the present disclosure.

The system 100 permits requests for authentication to be granted based on requestor interactions with a real-world object interaction system 102 that includes one or more real-world objects 152 as shown in the schematic diagram of FIG. 3. For example, the authentication process may include a prompt to provide a physical key via the real-world interaction system 102 and to arrange real-world objects 152 to form a physical key that is indicative of an authorized interaction. The real-world object or objects 152 may include items that may be assembled in a pattern or arrangement 154 relative to one another in a manner associated with the predetermined physical key or password. Once assembled, the system 100 may determine that the physical key is valid, and the requestor may be authenticated as the particular authorized user associated with the physical key. In certain embodiments, the physical key may be assembled from common household objects of the authorized user's preference. In this manner, the physical key may be assembled easily no matter where the requestor is located and without requiring that the requestor carry the objects with him. That is, the real-world objects 152 need not be a particular set may be any objects of a particular type (e.g., any paper clips may be used to create the physical key) While the illustrated embodiment shows paper clips, the real-world objects 152 may be any suitable object. By way of example, the real-world object or objects 152 may include coins, writing implements, food items, toiletries, clothing or wearable items, etc. Further, the physical key that includes the pattern or arrangement 154 of real-world objects 152 may include all objects of a same type (e.g., all paperclips as illustrated) or an ordered or unordered combination of different types of objects (e.g., a quarter, a pencil, and a stapler). In an embodiment, the real-world objects 152 may be a toy or puzzle, and interaction with the toy or puzzle in a particular manner is associated with authentication. For example, a particular pattern of one or more faces generated in a Rubik's cube may be an authorized interaction while all other potential patterns are categorized as unauthorized interactions. In another example, mating a subset of puzzle pieces of a particular jigsaw puzzle may be an authorized interaction while mating another subset of the puzzle is categorized as unauthorized interaction.

In certain embodiments, the physical key is a particular pattern or arrangement 154 of the real-world objects 152 that may be authenticated based on one or more characteristics, such as a shape formed by the real-world objects 152 (e.g., a star, a pyramid as shown, a circle), a total number of the real-world objects 152, distances between individual objects of the real-world objects 152, or angles formed between individual objects of the real-world objects 152. The authentication may be based on these characteristics falling within a predetermined tolerance, e.g., within particular distance or angle range thresholds. In this manner, the arrangement of the real-world objects 152 may not be exact, which may be difficult to replicate. However, the pattern or arrangement 154 may be sufficiently complex such that it is unlikely to be recreated without prior knowledge of the authentication information of an authorized user. First, the selection of the real-world object or objects 152 by the authorized user (or that is assigned to the authorized user) provides a first level of security, whereby the potential type and number of objects provides a large number of combinations. Second, the selected pattern or arrangement of these objects provides an additional layer of security. Even if an unauthorized user were to obtain the real-world objects 152, it is unlikely that the pattern or arrangement 154 would be inadvertently duplicated. Additional features of the real-world objects 152 may also contribute to the pattern or arrangement. For example, a predetermined number of colored pencils or crayons may be arranged according to a particular color pattern (e.g., alternating, according to a color gradient) and to form a particular shape. If the real-world objects 152 have a particular orientation, the individual orientations may also contribute to the pattern or arrangement 154. By way of example, in the illustrated embodiment all of the paper clips have a same orientation. However, it certain embodiments, one or more of the paper clips may have a reverse orientation (e.g., rotated 180 degrees) in the left-right direction. The order in which the pattern or arrangement 154 is formed may also contribute to authentication. For example, each individual object of the real-world objects 152 may be assembled in a left-to-right order (or vice versa), clockwise or counterclockwise, in an alternating manner, etc., as part of the authenticated arrangement. Accordingly, the sensor data may be collected over a period of time.

The real-world interaction system 102 may include a surface or platform upon which the objects are arranged to denote particular monitored spots for ease of collection of data. However, in other embodiments, the real-world interaction system 102 may only include the real-world objects 152, which may be active or passive.

The system 100 may permit the authorized user to set the physical key using his or her preferred set of real-world objects 152 and preferred pattern or arrangement. Alternatively, the system 100 may permit selection among a provided set of real-world objects 152 and/or a provided set of patterns or arrangements. The system 100 may also assign the physical key. The system 100 may also perform a quality control metric to determine if the physical key is sufficiently stringent. For example, the authorized user may provide an image of a proposed physical key, and the authenticator 108 may perform an assessment to determine if the physical key is sufficiently unique. While a single paper clip may not be sufficiently unique, the pyramid arrangement of FIG. 3 may be determined to have enough distinguishing factors to be sufficiently unique.

The sensor or sensors 106 that detect the real-world objects 152 may include any suitable sensors. In an embodiment, the sensor is a camera that collects still images or a video feed and provides the camera data (e.g., the image data) of the real-world objects 152 in the camera field of view to the authenticator 108. In an embodiment, the image or images are not stored on or are automatically discarded (e.g., after a threshold time has passed or after communication of the image) from the device associated with the sensors 106 such that the authenticated images are not available subsequent to the authentication request. The camera may be part of a mobile device (e.g., mobile device 120) that also is configured to communicate with the authenticator 108 to send the authentication request and the sensor data. The authenticator 108 performs image processing to assess the pattern or arrangement depicted in the camera data. The image processing may include feature recognition. Further, because the authenticator 108 accesses information associated with an authorized interaction, the authenticator 108 may be preprogrammed to pick out the real-world objects 152 associated with the user identified in the authentication request. In one example, the tolerance settings may be programmed such that any object of a particular type is recognized as being authenticated. For example, if the physical key includes a toothbrush, a recognized or authenticated toothbrush may be any object having an elongated handle (within certain common length and width tolerances) and bristles (within certain common length and width tolerances) at one end. The color of the handle or bristles may not be part of the feature recognition in one embodiment to permit a variety of toothbrushes to be recognized. The sensors 106 may additionally or alternatively include strain gauge sensors, pressure sensors, optical sensors, radio frequency sensors, or capacitive sensors. In an embodiment, the sensor 106 may be integrated into a touch screen 156, such as a capacitive touch screen, of a tablet or mobile device. The real-world objects 152 may be placed on the touch screen 156, which senses the presence of the real-world objects 152 and provides corresponding sensor data to the authenticator 108. The capacitive sensors generate sensor data characteristic of the objects 152 and their relative positions on the touch screen 156, based on which the authentication can be performed. That is, a shape of a contact surface of an individual object 152 with the touch screen 156 can be determined based on the capacitive sensor data. The shape of the contact surface is characteristic of the object itself. Thus, a paper clip, pencil, and playing card could be distinguished, by way of example, based on their respective different sensed contact surface size and shapes. Similarly, their relative positions to one another could be distinguished. In one example, the authentication may be based on a predetermined distance pattern between objects of any type. Thus, the particular size and shape of the object may be immaterial, but the authentication can be based on their spacing or pattern. Thus, a particular pattern can be formed with coins of any type, buttons, and/or other relatively small objects. As noted, part of the pattern may include an authenticated order of operations for laying out the pattern.

Figure 4:
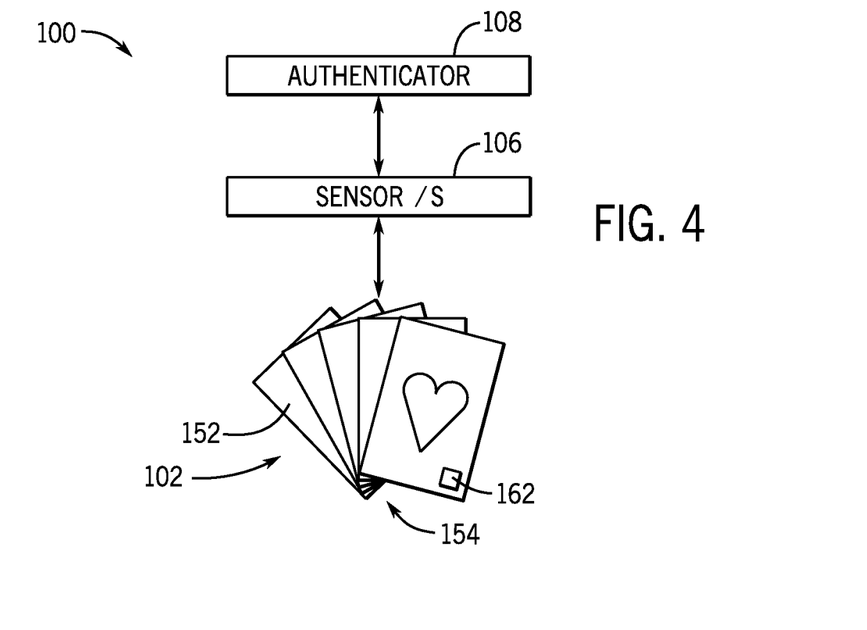
FIG. 4 is a schematic representation of a real-world object interaction system that may be used in conjunction with the system of FIG. 1, in accordance with an embodiment of the present disclosure.

FIG. 4 depicts the real-world objects 152 as being in a pattern or arrangement 154 of playing cards. The pattern or arrangement 154 may include particular playing cards in an ordered arrangement (e.g., 7, 9, and queen, by way of example). The authorized interaction may also require presentation of particular suits of each of the required cards. While, in certain embodiments, any card deck may be used to create the pattern, in other embodiments, the real-world object 152 is a dedicated object or objects that are a required part of the authentication process and that may carry additional identifying features or sensors that communicate data to the system. For example, one or more of the cards may include a tag 162 (e.g., an RFID tag) that is sensed by the sensors 106 and that serves as an additional authentication factor. In an embodiment, the arrangement 154 associated with the authentication request is not authorized if the tagged card is not present, even if the arrangement 154 is otherwise correct. In certain embodiments, the authentication process may initiate when the tag 162 is read. Subsequent to reading the tag, the system 100 provides prompts to provide the physical key via interaction with the real-world interaction system 102, which involves positioning the real-world objects in the pattern or arrangement 154.

Figure 5:
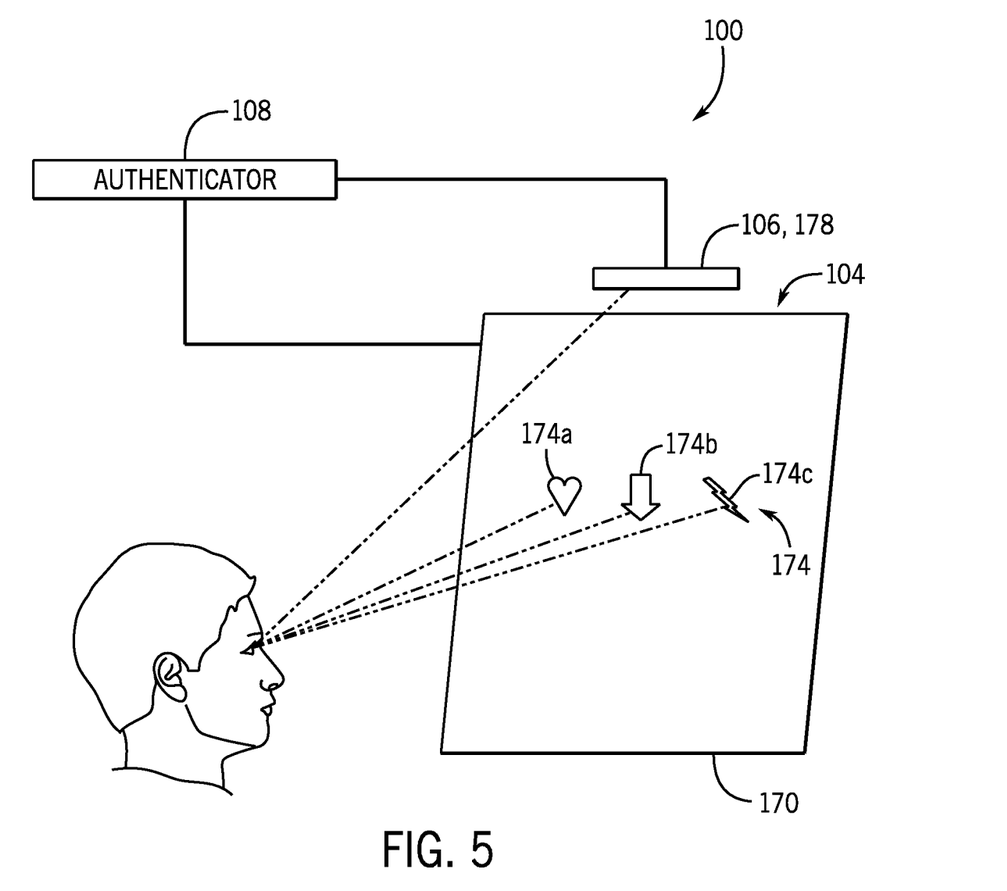
FIG. 5 is a schematic representation of an image interaction system that may be used in conjunction with the system of FIG. 1, in accordance with an embodiment of the present disclosure.

As provided herein, the system 100 may use one or more of the real-world interaction system 102 or the image interaction system 104 to authenticate a request from a requestor. FIG. 5 is a schematic illustration of an embodiment of the image interaction system 104 in which the system 104 causes display on a display screen 170 of an authentication image 174 in response to an authentication request. The display screen 170 may be associated with or coupled to any of the components of the system 100 (see FIG. 1), such as the requestor device 142 or a dedicated terminal.

The requestor, in response to the authentication image 174, interacts with the authentication image in a manner that is detectable by the sensor 106, which may be a gaze tracking sensor 178. In the depicted embodiment, the authentication image 174 includes different portions representing different displayed objects. While an unauthorized user may tend to gaze generally around the authentication image 174 or even at individual portions of the authentication image 174a, 174b, 174c in a left-to-right manner, the image interaction pattern may be more complex. For example, the pattern (e.g., an authentication pattern) associated with an authorized interaction may involve first looking to a first portion 174c of the authentication image 174 for a predetermined time and then looking at a second portion 174a of the authentication image 174a for a predetermined time, following by looking at the middle or third portion 174b for a predetermined time. It should be understood that the disclosed image interaction pattern of gazes is by way of example, and other patterns are also contemplated. Further, the image interaction may include portions of the authentication image that the authorized user should avoid or look away from as part of an authorized image interaction. In addition, the image interaction may involve a series of authentication images, some of which may be red herrings or not involved in authentication. Based on the observed pattern of gazes, the authenticator 108 may determine if the authentication request of the requestor should be granted.

The system 100 may also include one or more sensors that are positioned to confirm that the image displayed on the display screen 170 corresponds to the intended authentication image 174. The authenticator 108 may be programmed to only grant the authentication request based on the confirmation of the displayed image corresponding to the authentication image 174.

Figure 6:
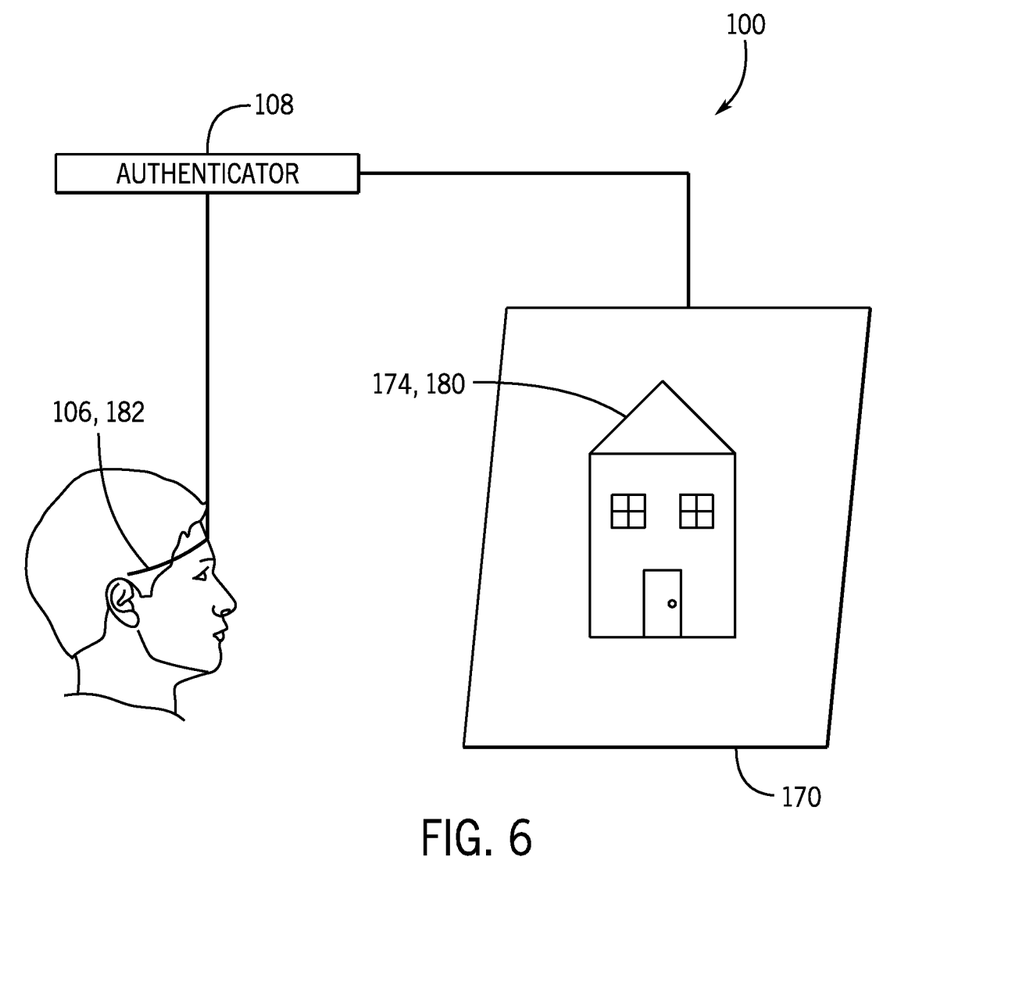
FIG. 6 is a schematic representation of an image interaction system that may be used in conjunction with the system of FIG. 1, in accordance with an embodiment of the present disclosure.

FIG. 6 is a schematic illustration of an embodiment of the image interaction system 104 in which the system 104 causes display on a display screen 170 of an authentication image 174. In one embodiment, the authentication image 174 is a familiar image 180 associated with a characteristic brain activity response in an authorized user. For example, the familiar image 180 may be a childhood home, a spouse or close relative, a beloved pet, or favorite food. These familiar images may generate characteristic brain activity patterns that would be difficult to replicate for an unauthorized user. Brain activity response may be detected by a sensor 106 that includes a brain activity sensor 182, such as an electroencephalography electrode set. The brain activity sensor 182 may be implemented as a headband or other headgear, or in any suitable format to be applied to a requestor.

Figure 7:
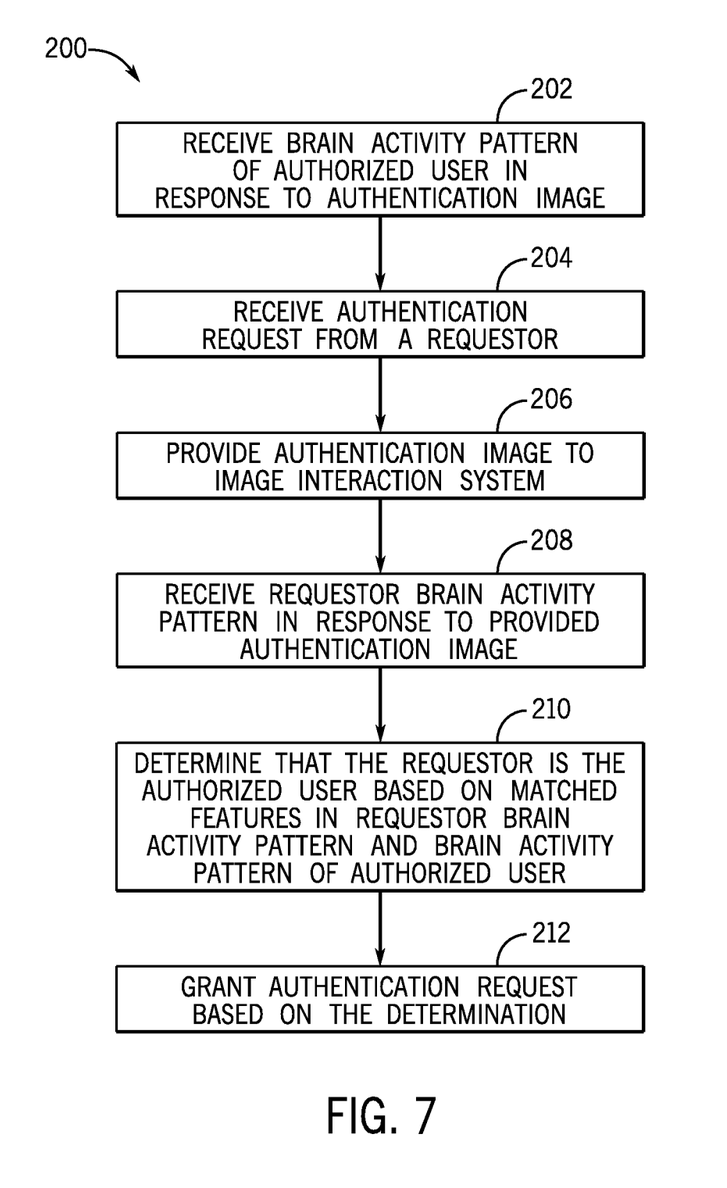
FIG. 7 is a flow diagram of a method of authenticating an authentication request received via an image interaction system that may be used in conjunction with the system of FIG. 1, in accordance with an embodiment of the present disclosure.

As shown in the flow diagram of FIG. 7, a method 200 of authentication may be used in conjunction with the embodiment illustrated in FIG. 6. The method 200 includes the step of calibrating the system 100 by recording a brain activity pattern of an authorized user in response to an authentication image 174 (block 202). As disclosed, the authentication image may be a familiar image 180 provided by the authorized user and selected to elicit a strong brain activity response that is personal to the authorized user. In an embodiment, the image is unique to the authorized user such that no two users are authenticated to the same image. As part of calibrating, the response of the authorized user to multiple familiar images 180 may be recorded, and the familiar image 180 associated with a best or strongest individual response may be selected. However, the authentication image 174 need not be a familiar image 180. The method 200 may also identify more common images to which the authorized user has a strong personal response that is distinguishable from a control. Such calibration to preselect authentication images 174 for which a strong personal response is generated may permit the system 100 to use less processing power to distinguish between authorized users and unauthorized users. That is, a strong brain activity signature is more easily distinguishable or may be identified using fewer characteristics.

The method includes the steps of receiving an authentication request form a requestor (block 204). The authentication request may include request information, such as an identification or username associated with a particular authorized user, an alphanumeric password, an identification of the originating device, location information, etc. In an embodiment, the authenticator 108 receives the authentication request and provides the appropriate authentication image 174 to the image interaction system 104 (block 206). The sensor 182 detects a requestor brain activity pattern in response to the authentication image 174 and proves the brain activity pattern to the authenticator 108 (block 208). The authenticator 108 determines if the requestor is the authorized user based on matches features in the brain activity pattern of the authorized user and requestor in response to the authentication image 174 (block 210). If the interaction is associated with an authorized user, the authentication request is granted (block 212).

Figure 8:
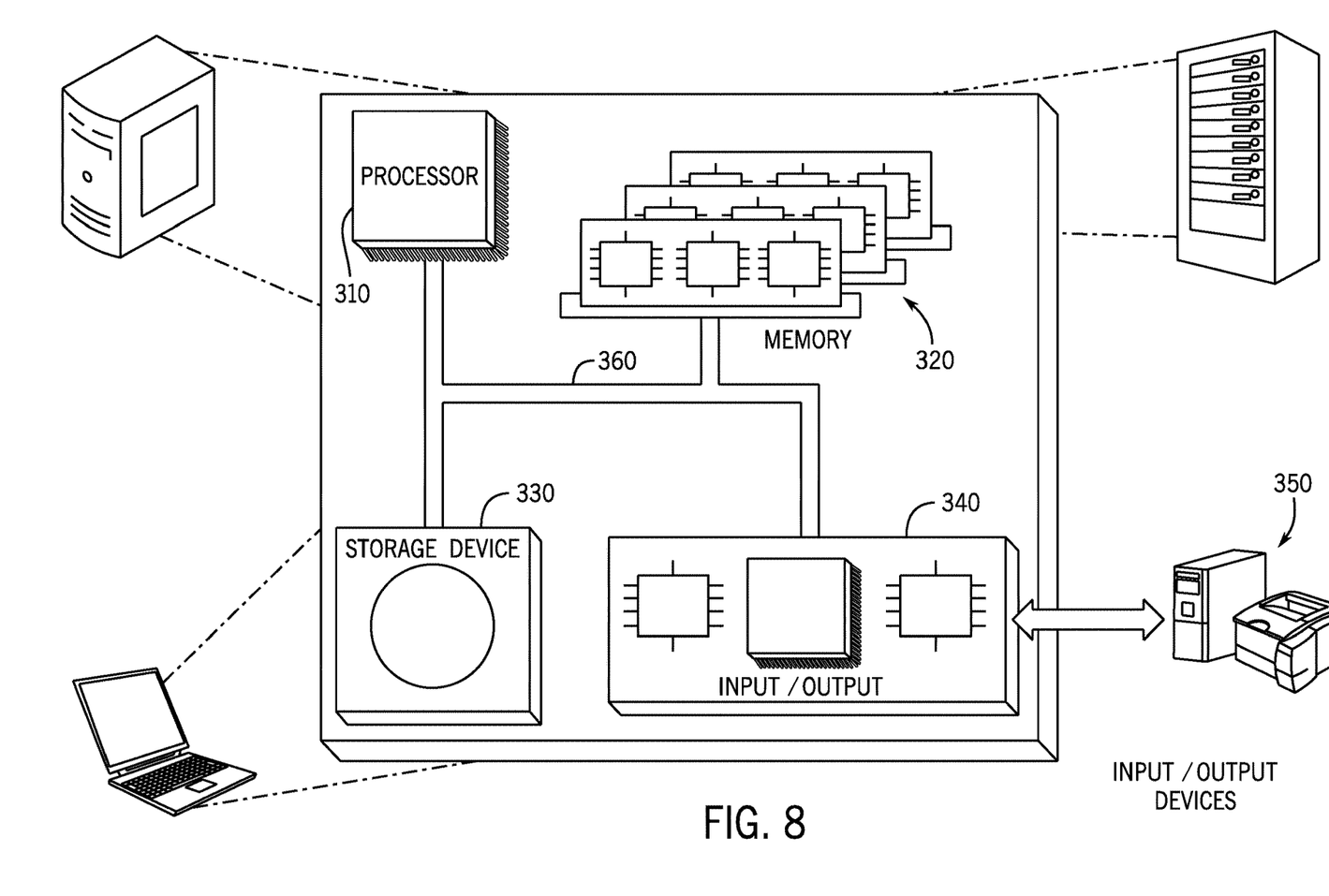
FIG. 8 is a block diagram of an example computing environment in which example embodiments and aspects may be implemented.

FIG. 8 depicts an example computing system 300, according to implementations of the present disclosure. The computing system 300 may be used for one or more of the operations described with respect to the various implementations discussed herein. For example, the computing system 300 may be included, at least in part, in one or more of the authenticator 108, the real-world object interaction system 102, the image interaction system 104, the sensor system 105, or other components of the system 100 or other computing device(s) described herein. The computing system 300 may include one or more processors 310, a memory 320, one or more storage devices 330, and one or more input/output (I/O) devices 350 controllable through one or more I/O interfaces 340. The various components 310, 320, 330, 340, or 350 may be interconnected through at least one system bus 360, which may enable the transfer of data between the various modules and components of the computing system 300.

The processor(s) 310 may be configured to process instructions for execution within the computing system 300. The processor(s) 310 may include single-threaded processor(s), multi-threaded processor(s), or both. The processor(s) 310 may be configured to process instructions stored in the memory 320 or on the storage device(s) 330. The processor(s) 310 may include hardware-based processor(s) each including one or more cores. The processor(s) 310 may include general purpose processor(s), special purpose processor(s), or both.

The memory 320 may store information within the computing system 300. In some implementations, the memory 320 includes one or more computer-readable media. The memory 320 may include any suitable number of volatile memory units and/or non-volatile memory units. The memory 320 may include read-only memory, random access memory, or both. In some examples, the memory 320 may be employed as active or physical memory by one or more executing software modules.

The storage device(s) 330 may be configured to provide (e.g., persistent) mass storage for the computing system 300. In some implementations, the storage device(s) 330 may include one or more computer-readable media. For example, the storage device(s) 330 may include a floppy disk device, a hard disk device, an optical disk device, or a tape device. The storage device(s) 330 may include read-only memory, random access memory, or both. The storage device(s) 330 may include one or more of an internal hard drive, an external hard drive, or a removable drive.

One or both of the memory 320 or the storage device(s) 330 may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the computing system 300. In some implementations, the CRSM may include a data store that provides storage of computer-readable instructions or other information in a non-transitory format. The CRSM may be incorporated into the computing system 300 or may be external with respect to the computing system 300. The CRSM may include read-only memory, random access memory, or both. One or more CRSM suitable for tangibly embodying computer program instructions and data may include any suitable type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor(s) 310 and the memory 320 may be supplemented by, or incorporated into, one or more application-specific integrated circuits (ASICs).

The computing system 300 may include one or more I/O devices 350. The I/O device(s) 350 may include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) 350 may also include one or more output devices such as a display, LED(s), an audio output device (e.g., a speaker), a printer, a haptic output device, and so forth. The I/O device(s) 350 may be physically incorporated in one or more computing devices of the computing system 300, or may be external with respect to one or more computing devices of the computing system 300.

The computing system 300 may include one or more I/O interfaces 340 to enable components or modules of the computing system 300 to control, interface with, or otherwise communicate with the I/O device(s) 350. The I/O interface(s) 340 may enable information to be transferred in or out of the computing system 300, or between components of the computing system 300, through serial communication, parallel communication, or other types of communication. For example, the I/O interface(s) 340 may comply with a version of the RS-232 standard for serial ports, or with a version of the IEEE 1284 standard for parallel ports. As another example, the I/O interface(s) 340 may be configured to provide a connection over Universal Serial Bus (USB) or Ethernet. In some examples, the I/O interface(s) 340 may be configured to provide a serial connection that is compliant with a version of the IEEE 1394 standard.

The I/O interface(s) 340 may also include one or more network interfaces (e.g., the network interface(s) 310) that enable communications between computing devices in the computing system 300, and/or between the computing system 300 and other network-connected computing systems. The network interface(s) may include one or more network interface controllers (NICs) or other types of transceiver devices configured to send and receive communications over one or more networks using any suitable network protocol.

Computing devices of the computing system 300 may communicate with one another, or with other computing devices, using one or more networks. Such networks may include public networks such as the internet, private networks such as an institutional or personal intranet, or any combination of private and public networks. The networks may include any suitable type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The computing system 300 may include one or more computing devices of any suitable type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and/or processor(s) of any appropriate kind of digital computer. Generally, a processor may receive instructions and data from a read only memory or a random access memory or both. Elements of a computer can include a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical UI or a web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

Although exemplary embodiments may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The invention claimed is:

1. An authentication system:
a sensor system of a mobile device, the sensor system comprising a camera; and a processor of the mobile device, the processor executing instructions of an application stored on the mobile device, wherein the instructions are configured to cause the mobile device to:
    activate the camera of the sensor system in response to an authentication request;
    cause the camera to capture an image comprising image data in a field of view of the camera and over a period of time;
    communicate the image data to an authenticator stored on the mobile device;
    receive authentication based on the authenticator determining that the image data is indicative of a plurality of real-world objects being assembled in a predetermined order relative to one another over the period of time to form an ordered arrangement that is associated with an authorized authentication request; wherein determining that the image data of the ordered arrangement of the plurality of real-world objects corresponds to the predetermined order associated with the authorized authentication comprises determining that the ordered arrangement comprises a first individual real-world object that forms an angle with a second individual real-world object, wherein the angle is within a predetermined range and wherein the authenticator is configured to recognize that an individual object of the plurality of real-world objects comprises a type of object corresponding to an assigned physical key associated with a user identified in the authentication request; and
    access a service on the mobile device based on receiving the authentication.

2. The authentication system of claim 1, wherein a memory of the mobile device automatically discards the captured image after a threshold time or after the image data has been communicated to the authenticator.

3. The authentication system of claim 1, wherein the authenticator is further configured to identify colors of individual objects of the plurality of real-world objects in the image data to determine that the image data of the plurality of real-world objects corresponds to the ordered arrangement of the plurality of real-world objects associated with the authorized authentication request.

4. The authentication system of claim 1, wherein the authenticator is configured to determine that the ordered arrangement comprises a first individual real-world object spaced apart a distance from a second individual real-world object, wherein the distance is within a predetermined range.

5. The authentication system of claim 1, comprising:
    automatically deactivating the camera after capturing the image; and
    displaying the received authentication.

6. The authentication system of claim 1, wherein the instructions of the application comprise instructions to perform a preliminary analysis of the image data to identify one or more of the real-world objects in the image data; and
    communicate the captured image to an authenticator of the service only when the real-world objects are identified by the application.

7. An authentication system, comprising:
a user interface that generates an authentication request;
communication circuitry configured to communicate the authentication request;
one or more sensors configured to generate sensor data indicative of an interaction of the one or more sensors with a plurality of real-world objects; and
an authenticator comprising a processor and a memory, wherein the authenticator is configured to:
    receive the authentication request and the sensor data;
    determine that the sensor data is indicative of an authorized interaction with the plurality of real-world objects, wherein the authenticator is configured to:
        identify shared features among individual objects of the plurality of real-world objects in the sensor data and a number of the plurality of real-world objects;
        identify in the sensor data that the plurality of real-world objects are assembled into a particular shape via laying out individual objects of the plurality of real-world objects in a predetermined order relative to one another on a surface, wherein the authenticator is configured to determine that the authorized interaction is based on the identified shared features and the identified number of the plurality of real-world objects, and identifying that the plurality of real-world objects are laid out to form the particular shape in the predetermined order and that the particular shape comprises a first individual real-world object that forms an angle with a second individual real-world object, wherein the angle is within a predetermined range and wherein the authenticator is configured to recognize that an individual object of the plurality of real-world objects comprises a type of object corresponding to an assigned physical key associated with a user identified in the authentication request; and
    in response to the determination, grant the authentication request.

8. The authentication system of claim 7, wherein the one or more sensors comprise a camera configured to capture image data of the interaction with the plurality of real-world objects.

9. The authentication system of claim 7, comprising a display screen comprising a capacitive touch screen and wherein the sensor data indicative of the authorized interaction with the plurality of real-world objects comprises sensor data captured by the capacitive touch screen and indicative of an arrangement of the plurality of real-world objects in the predetermined order on the capacitive touch screen.

10. The authentication system of claim 9, wherein the authenticator is configured to:
    determine a shape of a contact surface of the display screen with the plurality of real-world objects based on the sensor data; and
    identify the plurality of real-world objects based on the determined shape of the contact surface, wherein the identified plurality of real-world objects is associated with the authorized interaction.

11. The authentication system of claim 1, wherein the predetermined order relative to one another is a left to right assembly of individual real-world objects of the plurality over the period of time to form the ordered arrangement.

12. The authentication system of claim 1, wherein the predetermined order relative to one comprises an alternating assembly of individual real-world objects over the period of time to form the ordered arrangement.

13. The authentication system of claim 1, wherein the predetermined order relative to one another comprises a clockwise or counterclockwise assembly of individual real-world objects over the period of time to form the ordered arrangement.

14. The authentication system of claim 1, wherein the authenticator is configured to recognize that an individual object of the plurality of real-world objects comprises a type of object corresponding to an assigned physical key associated with a user identified in the authentication request.

15. The authentication system of claim 1, wherein the plurality of real-world objects comprises separate objects that are configured to be positioned relative to one another on a surface to assemble the ordered arrangement.

16. The authentication system of claim 15, wherein each of the separate objects of the plurality has a uniform size and shape relative to one another.

* * * * *